(12) United States Patent
Sebban

(10) Patent No.: US 8,784,917 B2
(45) Date of Patent: Jul. 22, 2014

(54) FOOD PRODUCT

(76) Inventor: Claude Sebban, Netanya (IL)

(*) Notice: Subject to any disclaimer, the term of this patent is extended or adjusted under 35 U.S.C. 154(b) by 0 days.

(21) Appl. No.: 13/698,993

(22) PCT Filed: May 17, 2011

(86) PCT No.: PCT/FR2011/051102
§ 371 (c)(1),
(2), (4) Date: Jan. 27, 2013

(87) PCT Pub. No.: WO2011/144859
PCT Pub. Date: Nov. 24, 2011

(65) Prior Publication Data
US 2013/0142914 A1    Jun. 6, 2013

(30) Foreign Application Priority Data
May 21, 2010  (FR) ...................................... 10 53957

(51) Int. Cl.
*B65D 85/00* (2006.01)
*B65D 81/34* (2006.01)
*B65D 81/32* (2006.01)
*B65D 75/58* (2006.01)
*A23L 3/00* (2006.01)
*B65B 55/00* (2006.01)
*B65D 25/08* (2006.01)

(52) U.S. Cl.
USPC ........... 426/120; 426/107; 426/112; 426/113; 426/114; 426/115; 426/234; 206/222; 206/219; 222/83; 222/83.5; 222/88; 141/329; 141/330

(58) Field of Classification Search
CPC . Y10S 215/08; Y10S 215/90; Y10S 215/901; B65D 51/20; B65D 51/2807; B65D 51/2814; B65D 51/2828; B65D 51/2835; B65D 81/32; B65D 81/3205; B65D 81/3211; B65D 81/3216; B65D 81/3222; B65D 81/3446; B65D 81/3453; B65D 2101/0023; B65D 2543/00064; B65D 2543/00074; B65D 2543/0012; B65D 2581/3404; B65D 2581/3429; B65D 2581/3432; B65D 25/04; B65D 25/08; B65D 25/09; A23L 3/00; A61J 2001/20; A61J 2001/2003; A61J 2001/2006
USPC ......... 426/106, 112, 113, 114, 115, 120, 122, 426/123, 132, 77, 78, 107, 234; 206/222, 206/219; 222/83, 83.5, 88; 141/329, 330, 141/364
See application file for complete search history.

(56) References Cited

U.S. PATENT DOCUMENTS 4,803,088 A * 2/1989 Yamamoto et al. ........... 426/107
4,836,370 A * 6/1989 Bosshard ...................... 206/222
(Continued)

FOREIGN PATENT DOCUMENTS

FR    2860213    9/2003
FR    2846196    4/2004
(Continued)

OTHER PUBLICATIONS

Machine translation of WO2009136038A1.*
(Continued)

*Primary Examiner* — Rena L Dye
*Assistant Examiner* — Danny Chen
(74) *Attorney, Agent, or Firm* — Mike S. Ryu

(57) ABSTRACT

The invention concerns a new food product (1) in the form of a meal comprising food (4) and a sauce (5), intended to be mixed for consumption of the meal, in closed packaging (1) comprising a container (2) in which the food (4) is placed and a lid (3) in which the sauce (5) is placed, the sauce being separated from the food by a seal (7) which closes off the part of the lid (3) facing the food (4) characterized in that the container (2) comprises a mechanism (11) to tear the seal (7) when the lid (3) is turned concurrently to the container (2) between a pre-tearing position of the seal (7) and a tearing position of the seal (7).

17 Claims, 1 Drawing Sheet

(56) References Cited

U.S. PATENT DOCUMENTS

| | | | | |
|---|---|---|---|---|
| 5,370,222 | A | * | 12/1994 | Steigerwald et al. ......... 206/222 |
| 5,718,933 | A | | 2/1998 | Fultz |
| 5,836,479 | A | * | 11/1998 | Klima et al. ................. 222/83.5 |
| 6,152,296 | A | * | 11/2000 | Shih .............................. 206/222 |
| 6,540,109 | B1 | * | 4/2003 | Klima et al. ................. 222/83.5 |
| 6,543,612 | B2 | * | 4/2003 | Lee et al. ....................... 206/222 |
| 7,279,187 | B2 | * | 10/2007 | Daniels et al. ................... 426/74 |
| 2007/0023299 | A1 | * | 2/2007 | Clarkson ....................... 206/219 |
| 2007/0170142 | A1 | * | 7/2007 | Cho .............................. 215/257 |
| 2008/0314775 | A1 | * | 12/2008 | Owoc .......................... 206/222 |
| 2010/0015293 | A1 | * | 1/2010 | Shapiro et al. ................. 426/87 |

FOREIGN PATENT DOCUMENTS

| | | |
|---|---|---|
| FR | 2929491 | 10/2009 |
| FR | WO2009/136038 A1 * | 11/2009 |
| JP | 4367476 | 12/1992 |
| WO | WO9833399 | 8/1998 |
| WO | WO2007003864 | 1/2007 |
| WO | WO2009136038 | 11/2009 |

OTHER PUBLICATIONS

International Search Report for PCT Application No. PCT/FR2011/051102, 4 pages, dated Jul. 26, 2011.

* cited by examiner

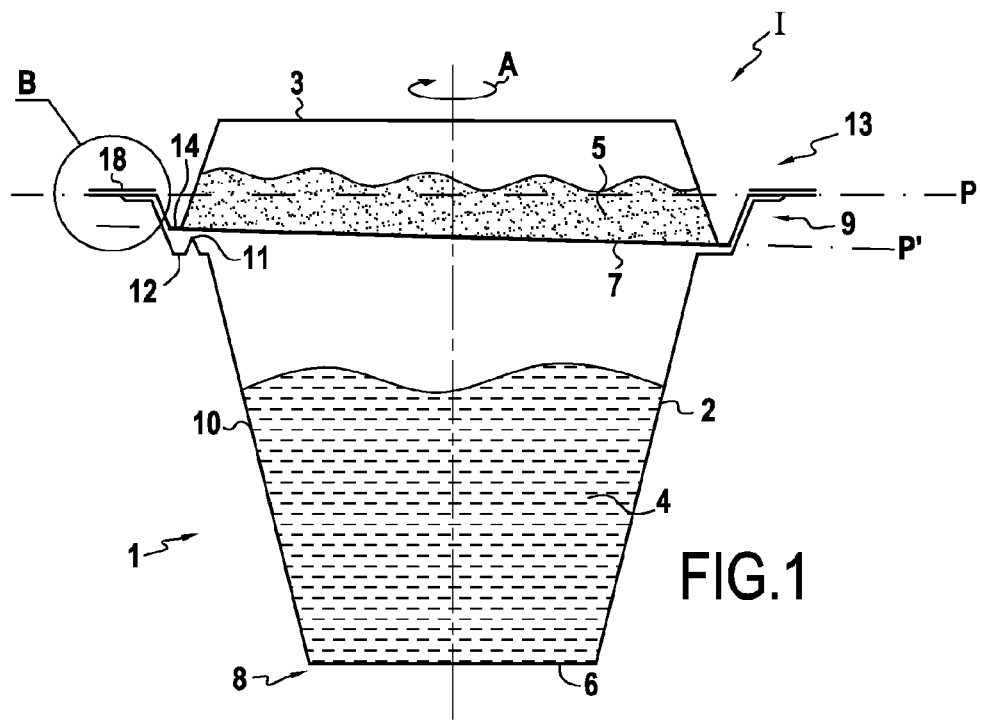
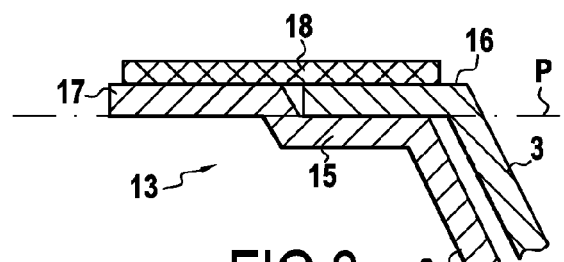
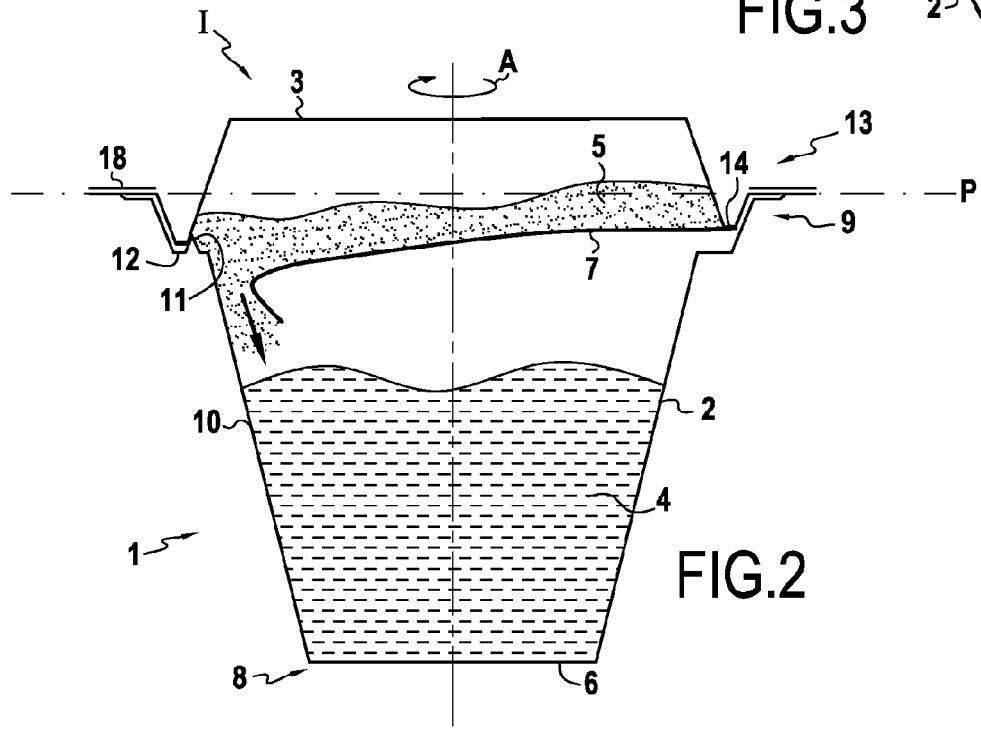

FOOD PRODUCT

CROSS-REFERENCE TO RELATED APPLICATIONS

This application claims priority to the following applications, each of which is fully incorporated by reference herein:

| FR 1053957 | Nouveau Produit Alimentaire | May 21, 2010 |
|---|---|---|
| WO2011144859 | Novel Food Product | May 17, 2011 |

The present invention concerns the field of ready-made meals, specifically pasta-based meals with sauce.

One inventor of the present patent application has described pasta-based packaged food products in previous patent applications, in particular patent applications FR 2 846 196, FR 2 860 213 and WO 2007/003864. These products comprise pasta covered in sauce and wrapped in packaging suitable for cooking or heating in a microwave. These products are suitable for conservation in the refrigerator or freezer and often have a use-by date of around two weeks. In the refrigerator, beyond two weeks, the pasta swells and softens due to the presence of the sauce.

Wanting to extend the use-by date, the inventors identified the need for a packaging in which the pasta and the sauce can be stored separately, while still being easy-to-use for the consumer. Furthermore, in certain cases, it could be useful to be able to pasteurize or sterilize the food products, preferably while they are in their final packaging. However, pasteurization is usually performed with heat, although new cold pasteurization procedures by irradiation now exist. In previous solutions where the pasta and sauce were mixed, the presence of the sauce together with the pasta prevented such pasteurization or sterilization, as satisfactory organoleptic results could not be obtained within the conservation period. Therefore, it is necessary to provide packaging in which the sauce and food are contained separately.

Certain solutions have already been developed. One such solution takes the form of two rectangular containers, separate but horizontally juxtaposed and attached together: one for the pasta and the other for the sauce. However, these solutions are not satisfactory for the consumer, who must heat the two containers together in a microwave, then detach them, remove the seal of each container, hold the sauce container, which is very hot, being careful not to burn himself, and pour the sauce over the pasta. The pasta can either remain in its container or itself be transferred to a plate. Similar solutions exist wherein the containers comprise several compartments.

A new food product was therefore proposed in patent application WO 2009/136038, in which the food is placed in one container and the sauce in a second, with the second container located above the food, and which comprises a closing mechanism directed towards the food, whose opening is not activated by pasteurization or sterilization processes of the meal, but is activated by microwave heating, whereby the sauce can be directly poured onto the food.

In this context, the inventor proposes an alternative solution, which is simpler for industrial manufacture, and suitable for all types of meals containing food and sauce which require being stored separately before consumption.

This solution must also be simple for the consumer and be extremely reliable. It must enable mixing the sauce and the food without complicated manipulations. In this context, the invention concerns a new food product in the form of a meal comprising food and a sauce, intended to be mixed for consumption of the meal. The meal is in closed packaging comprising a container in which the food is placed and a lid in which the sauce is held, the sauce being separated from the food by a seal closing off the part of the cover facing the food, characterized in that the container comprises a mechanism for tearing the film when the lid is turned concurrently to the container, between a pre-tearing position of the seal and a tearing position of the seal.

The sauce rests on the seal until the tearing mechanism tears the seal, causing the sauce to be poured onto the food. In the pre-tearing position of the seal, the tearing mechanism is located away from the seal.

For this invention, the lid in which the sauce is held is opened by tearing the seal, which the consumer does by turning the lid concurrently to the container. As a result, the sauce is poured onto the food without having to remove the lid from the container, which represents a significant advantage for the consumer.

No manipulation by the consumer is required, which eliminates risks of contamination. When the meal is heated, there is no longer a risk of burning oneself by having to hold a container of burning sauce. As the sauce and the food are packaged separately, there are no longer the same effects of absorption as when they are mixed together in their packaging. It is consequently possible to reduce the quantity of sauce necessary, which is particularly advantageous in terms of cost.

According to one possibility, the lid is held on the container by a tamper-proof seal which ensures the packaging is hermetically sealed. This tamper-proof seal is removed by the consumer before turning the lid towards a position for tearing the seal.

According to another possibility, which can be combined with previous scenarios, the container comprises a guidance mechanism for rotating the lid. As illustrated in the following implementation examples, this guidance mechanism for rotating the lid may comprise a support mechanism, lying approximately perpendicular to the rotation axis of the lid, the seal lying in a slanted position relative to the support mechanism, in such a way that pressure is applied to the tearing mechanism when the lid is rotated. Usefully, when the seal is in its tearing position, it is in a position slanted towards the bottom of the container, facilitating the pouring of the sauce into the container.

According to another possibility, the support mechanism consists of a support rim located at the edge of the container, upon which the support shoulder of the lid rests. Usefully, the support rim is extended by a back-link providing a slotting surface for the supporting edge, so that the latter is approximately coplanar with the back-link. Consequently, the back-link and the support rim may together constitute a sealed surface for a tamper-proof seal.

According to another possibility, which can be combined with previous scenarios, the tearing mechanism is a cutting element.

According to another possibility, which can be combined with previous scenarios, the meal is sterilized or pasteurized.

According to another possibility, which can be combined with the previous scenarios, the meal is intended to be heated in the microwave and consequently, the container is made from microwave-transparent material. The invention will now be described in more detail, with references to the example illustrating one possible implementation of the invention.

FIG. 1 represents a schematic sectional view of an example of a food product according to the invention, in a pre-tearing position of the seal.

FIG. 2 represents a schematic sectional view of an example of performing FIG. 1 in a position for tearing the seal.

FIG. 3 represents a close-up image of part B as shown in FIG. 1.

As presented in FIG. 1, the food product 1 according to the invention comprises packaging 1 in which a meal is placed. The packaging comprises a container 2 and a lid 3, which covers the container when the packaging is closed.

The meal comprises food 4 and a sauce 5.

In FIG. 1, the sauce 5 and the food 4 are packaged separately. The food 4 is located in the bottom 6 of the container 2, while the sauce 5 is placed in the lid 3. The sauce 5 is separated from the food 4 by a seal 7 closing off the part of the lid facing the bottom 6 of the container 3 and therefore facing the food 4. The seal 7 can be in the form of a film, paper or bag, sealed onto the lid 3. The sauce 5 sits on the seal 7 due to gravity. This position, in which the seal 7 is intact, is called the pre-tearing position of the seal 7. The packaging 1 is closed in this pre-tearing position of the seal during stocking, transport and storage of the food product, which could be stored in the refrigerator or in the freezer. Advantageously, as illustrated in FIG. 1, in this position the container 2 and the lid 3 are closed together by a tamper-proof seal 18 ensuring it is hermetically closed. This tamper-proof seal would preferably be peelable, so that it could be easily removed when the meal is consumed.

The container 2 can take different forms. It can notably take the forms described in documents FR 2860213 and WO 2007/003864. In the example presented in FIG. 1, the container 2 is presented in the form of a truncated container whose bottom base surface 8 is lower than the top base surface 9. The bottom base 8 of the truncated container 2 is closed by a solid sheet, constituting the bottom 6 of the container, upon which the food 4 is placed.

The walls 10 of the container 2 can be smooth. The walls 10 could also comprise distribution elements as described in patent application WO 2007/003864. The bottom 6 could be flat or comprise a compartment for water, etc., or even comprise a grooved raised area. The container could even have a false-bottom on which the food 4 would be placed.

The lid 3 and the container 2 would preferably be made from a microwave-transparent material which is non-degradable during microwave heating, for example thermoplastic material, such as polypropylene or polyethylene.

An essential characteristic of the present invention is that the container is equipped with a mechanism 11 which tears the seal 7 when the lid is turned concurrently to the container 2 until the tearing position of the seal 7 is achieved. This tearing mechanism 11 can take various forms. It could be a cutting element, such as a slicing component or a pointed pin as illustrated in FIG. 1. The seal is therefore opened mechanically. In the pre-tearing position of the seal, which is the position in which the food product 1 is stored, the tearing mechanism 11 is located away from the seal 7. The tearing mechanism 11 can be located inside the container 2 in the upper part, level with the support shoulder 12 and also level with the container's 2 internal walls 10 so it is directed towards the seal 7. By turning the lid 3 concurrently to the container 2, in a reciprocating movement, or as illustrated in FIGS. 1 and 2 by a rotational movement, the seal 7 is brought into contact with the tearing mechanism 11, causing the seal 7 to tear. The fact of bringing the seal 7 into contact with the tearing mechanism 11 causes the seal 7 to tear with total reliability. The rotation occurs around axis A, approximately corresponding to the central axis of the lid 3 which coincides with the central axis of the container.

The container 2 usefully comprises a guidance mechanism for rotating the lid. This rotational guidance mechanism 13 can be made from a thread, such as screw thread, helicoidally shaped and located at the top of the container walls 2. According to the preferred method illustrated in FIGS. 1 and 2, the guidance mechanism 13 for rotating the lid 3 comprises a pressure point P on the lid 3, which lies approximately perpendicular to the rotational axis A of the lid 3, and the seal 7 lies in a slanted position P' relative to the pressure point P, in order to apply pressure to the tearing mechanism 11 when the lid 3 is rotated. This rotational guidance mechanism 13 enables the lid 3 to be turned concurrently to the container 2, without a reciprocating movement. The lid 3, which has an uneven thickness, as illustrated in FIG. 1, is placed in the pre-tearing position of the seal 7, so that the thinnest part of the lid is situated next to the tearing mechanism 11. The lower part of the lid 3 has a support surface 14 for the seal 7, upon which the latter can be fixed, by heat-sealing, for example. When the meal is pasteurized or sterilized, the seal 7, as well as its contact with the lid 3, must resist both processes, which are possibly performed in an autoclave. This support surface 14 is in the P' mechanism, but is not aligned with the tearing mechanism 11, so that when the seal 7 is brought into contact with the tearing mechanism 11 by rotation of the lid, this contact occurs after the support surface 14, enabling the seal 7 to tear in the area where the sauce 5 is held. In the pre-tearing position of the seal 7 presented in FIG. 1, the position of the seal 7 relative to the tearing mechanism 11 is further from the bottom 6 of the container 2 than from the area opposite the tearing mechanism 11. As the seal lies in a slanted position, rotating the lid brings the seal 7 closer to the tearing mechanism 11 until the two come into contact. On an axis passing by the tearing mechanism 11 lying in parallel to the rotational axis A, the distance between the tearing mechanism 11 and the seal 7 is reduced as the lid 3 is turned concurrently to the container 2, between a pre-tearing position and a tearing position as presented in FIG. 2. Furthermore, when torn, the seal 7 is in a position slanted towards the bottom 6 of the container 3, facilitating the pouring of the sauce. The seal 7 could also possibly be unpeeled from the lid 3, as described in patent application WO 2009/136038, when heated in the microwave. In this case, the tearing mechanism 11 could be used if the heat has not succeeded in unpeeling the seal, or if mixing the sauce with the food is required without, or prior to, heating.

Turning the lid 3 may not necessitate a full rotation: it may only require rotating the equivalent of a third of the way round so that the seal 7 remains attached to the lid 3 and does not fall onto the food 4. Thus, when the lid 3 is removed from the container 2, the seal 7 is also removed. In a variation not illustrated here, the container 2 could alternatively comprise a rotation-limitation mechanism on the lid 3, in the form of a raised point inside the container 2, level with the trajectory of the lower part of the lid 3.

In the example illustrated in the Figures, and as shown in the close-up image of FIG. 3, the support point P is limited by a supporting border 15 located around the rim of the container 2 upon which rests a supporting shoulder 16 for the lid 3. The supporting border 15 is extended by a back-link 17 providing a slotting surface for the support shoulder 16, so that the latter is approximately coplanar with the back-link 17. In this case, the back-link 17 and the support border 15 can together constitute a sealing surface for the tamper-proof seal 18, as shown in FIG. 3. In the illustrated example, the tamper-proof seal 18 is in the shape of a ring. It is of course necessary to remove the tamper-proof seal 18, before rotating the lid 3 in order to open the seal 7. Using a tamper-proof seal 18, such as a heat-sealed polymer film, means that directly welding the lid onto the container is not necessary. In particular, when the lid and the container are both made of polypropylene, they can be welded together, but in this case they cannot be detached later. The rims of the lid and container being coplanar enables them to be sealed with a tamper-proof seal, such as a peelable film. A film made from polyester and/or polyamide could be used. This peelable film can be sealed by heat-sealing, positioned straddled over the two rims which form the back-link 17 and the support shoulder 16. When the meal is sterilized or pasteurized, the tamper-proof seal 18, along with its contact with the container 2 and the lid 3 should preferably resist sterilization or pasteurization performed in an autoclave for example, so that the tamper-proof seal 18 can be put in place before sterilization or pasteurization.

A food product according to the invention can easily be manufactured on an industrial scale. Indeed, it is a simple matter of placing the sauce in the lid and the food in the container. The lid is sealed after being filled with the sauce. The container is then closed with the lid and the whole package is hermetically sealed with the tamper-proof seal. Indicators could be included on the lid and on the container, so that when closed, the tearing mechanism is positioned at the thinnest level of the lid. The tamper-proof seal also enables autoclave treatment, required if the meal must be pasteurized or sterilized. Furthermore, for industrial manufacture, the lid and container could be made by thermoforming rather than injection, which would generate much lower tooling costs.

As in the versions described in patent applications FR 2 860 213 and WO 2007/003864, the food product according to the invention is ready for consumption very quickly and easily. The packaged product is perfectly suitable for heating or cooking in the microwave, in which case the consumer heats the food product which contains the sauce in the lid.

During the microwave heating time:
The food is steam-cooked or heated;
The sauce heats;
When the tamper-proof seal is made from a peelable film, this opens slightly to enable generated steam to escape.

After the microwave heating time, the consumer completely opens the packaging by totally unpeeling the tamper-proof seal, turns the lid concurrently to the container in order to mechanically tear the seal, thus pouring the sauce over the food. The consumer can then mix the food with the sauce, possibly using the packaging as a "shaker", remove the lid and eat the meal. This solution enables the consumer to avoid burning himself when mixing the sauce with the food once the meal is ready for consumption. The consumer can alternatively choose to remove the tamper-proof seal, then turn the lid concurrently to the container, thus tearing the seal, prior to heating.

Food can be eaten directly from the container. The meal, such as a tasty pasta dish, is created with a simple manipulation to add the sauce to the food, by turning the lid concurrently to the container, without removing the lid from the container. The meal can be consumed directly without having to be transferred to another container. Such packaging is therefore perfectly suitable for use in hotels, bars, fast food restaurants, sport or leisure centres, and more generally in all areas where a catering service is offered. If the meal must be pasteurized or sterilized, the food product is perfectly suitable for Medium and Large-scale Distribution as a refrigerated product with a use-by date of around 4-6 weeks.

Evidently, the solution proposed in the present invention is especially suitable in cases where the food is pasta or a pasta-based meal, but could also be used for other foods, such as starch-based foods like rice, as well as vegetables, mashed potato, bulgur and couscous. By pasta is meant pasta for culinary consumption which can come in many forms, including penne, noodles, tagliatelle, spaghetti, etc. The pasta is pre-cooked and may be covered in a mixture of water/oil for pasteurization, or possibly cooked for sterilization. The food may also contain "key elements", such as chunks of fish, meat or seafood.

By sauce is meant a preparation containing a certain quantity of water and having a liquid or semi-liquid consistency. This sauce gives the desired taste to the food. The sauce can contain different ingredients, including herbs, vegetables, fats, proteins such as fish, meat or seafood chunks, according to the desired taste. In all cases, the sauce contains a certain quantity of water.

This sauce can be made using any aqueous liquid, such as chicken stock, wine or coconut milk, etc.

What is claimed is:

1. A packaged food product including a food component (4) and a sauce (5) provided in packaging (1), the packaging comprising:
   a container (2) containing the food component (4); and
   a lid (3) rotatably engageable with the container (2) about an axis of rotation and in a plane perpendicular to the axis of rotation, the lid selectively closing the container (2) and having an open concavity into which the sauce (5) is received, the sauce (5) being selectively separated from the food component (4) by a seal (7) closing off the open concavity of the lid (3) facing the food component (4) in the container (2),
   wherein the container (2) comprises a tearing mechanism (11) constructed and arranged to selectively tear the seal (7) along a circumferential direction when the lid (3) is rotated about the axis of rotation between a pre-tearing position and a tearing position,
   wherein the open concavity of the lid (3) is defined by an edge portion of the lid (3) that lies in a plane skewed to a plane perpendicular to the axis of rotation of the lid (3), the seal (7) being fixed to the edge portion such that the seal (7) likewise lies in the skewed plane, wherein in the pre-tearing position of the lid (3), the tearing mechanism (11) is spaced away from the seal along the direction of the axis of rotation of the lid (3), and in the tearing position the tearing mechanism (11) is relatively closer to the seal (7) to permit tearing of the seal (7);
   wherein the sauce (5) rests substantially on the seal (7) above the food component (4) when the lid (3) is engaged with the container (2), such that the sauce (5) can fall onto the food component (4) when the seal (7) is torn.

2. The food product according to claim 1, wherein the container (2) includes a radially extending stepped support portion having a radially inner circumferential support rim (15) and a radially outward circumferential portion (17) raised higher in the direction of the axis of rotation than the radially inward circumferential support rim (15), wherein the lid (3) includes a radially extending support (16) shoulder sized and arranged to be rotatably received in cooperation with the radially inner circumferential support rim (15) of the container (2).

3. The food product according to claim 2, wherein the support shoulder (16) of the lid (3) lies substantially coplanar with the radially outward circumferential portion (17) of the container (2), wherein the packing further comprises a removable tamper-proof seal (18) extending over the support shoulder (16) and the radially outward circumferential portion (17) for positionally fixing the lid (3) relative to the container (2) and for providing a hermetic seal therebetween.

4. The food product according to claim 1, wherein the packaging is made from a material that is one or more of transparent to microwave energy, and suitable for food industry sterilization processes.

5. The food product according to claim 1, wherein the tearing mechanism (11) comprises a mechanical cutting element.

6. Food packaging adapted for storing first and second food components separately and for combining them before consumption, the packaging comprising:
   a container; and
   a lid rotatably engageable with the container about an axis of rotation coincident with a central axis of the container, the lid selectively closing the container and having an open concavity selectively separated from an interior of the container by a seal closing off the open concavity of the lid,
   wherein the container comprises a tearing mechanism constructed and arranged to selectively tear the seal along a circumferential direction when the lid is rotated between a pre-tearing position and a tearing position,
   wherein the open concavity of the lid is defined by an edge portion of the lid that lies in a plane skewed to a plane perpendicular to the axis of rotation of the lid, the seal being fixed thereto to the edge portion such that the seal likewise lies in the skewed plane, wherein in the pre-tearing position of the lid, the tearing mechanism is spaced away from the seal along the direction of the axis of rotation of the lid, and in the tearing position the tearing mechanism is relatively closer to the seal to permit tearing of the seal, such that the torn portion of the seal is at a lower most position relative to the plane perpendicular to the axis of rotation of the lid.

7. The packaging according to claim 6, wherein the container includes a radially extending stepped support portion generally lying in a plane perpendicular to the axis of rotation of the lid and having a radially inner circumferential support rim and a radially outward circumferential portion raised higher in the direction of the axis of rotation than the radially inward circumferential support rim, wherein the lid includes a radially extending support shoulder sized and arranged to be received in rotatable cooperation with the radially inner circumferential support rim of the container.

8. The packaging according to claim 7, wherein the support shoulder of the lid lies substantially coplanar with the radially outward circumferential portion of the container, wherein the packing further comprises a removable tamper-proof seal extending over the support shoulder and the radially outward circumferential portion for positionally fixing the lid relative to the container and for providing a hermetic seal therebetween.

9. The packaging according to claim 6, wherein the lid, container, and seal are made from a material that is one or more of transparent to microwave energy and suitable for food industry sterilization processes.

10. The packaging according to claim 6, wherein the tearing mechanism comprises a mechanical cutting element.

11. The packaging according to claim 6, wherein the seal is a film.

12. A method of storing and preparing a food product comprising first and second food components for consumption, the method comprising:
   providing an open container containing the first food component, the container including a seal tearing mechanism;
   selectively engaging a concave lid with the container to close the container, a second food component being provided in a concavity of the lid and being selectively separated from the first food component by a seal closing off the concavity of the lid and retaining the second food component therein, wherein the lid is in rotatable engagement with the container about an axis of rotation between a pre-tearing position and a tearing position at which the tearing mechanism tears the seal, the concavity of the lid being defined by an edge portion lying in a plane skewed relative to a plane perpendicular to the axis of rotation, the seal being fixed to the edge portion such that the seal likewise lies in the skewed plane;
   prior to consumption, rotating the lid between the pre-tearing position and the tearing position such that the seal is moved towards the seal tearing mechanism in a direction along the axis of rotation until the seal tearing mechanism tears the seal at the tearing position; and
   permitting the second food component to leave the concavity of the lid via the tear in seal formed by the seal tearing mechanism, without fully separating the seal from the lid.

13. The method according to claim 12, further comprising, prior to consumption and prior to tearing the seal, agitating the closed container to mix the first and second food components.

14. The method according to claim 12, further comprising heating the first and second food components prior to tearing the seal.

15. The method according to claim 14, wherein heating the first and second food components comprises heating the first and second food components with a microwave energy.

16. The method according to claim 12, further comprising:
   after engaging the lid to the container, hermetically sealing the lid relative to the container thereby preventing rotation of the lid relative to the container; and
   prior to rotating the lid between the pre-tearing position and the tearing position, unsealing the lid and container from one another.

17. The method according to claim 12, wherein rotating the lid comprises rotating the lid relative to a single plane perpendicular to the axis of rotation.

\* \* \* \* \*